12
UNITED STATES PATENT OFFICE.

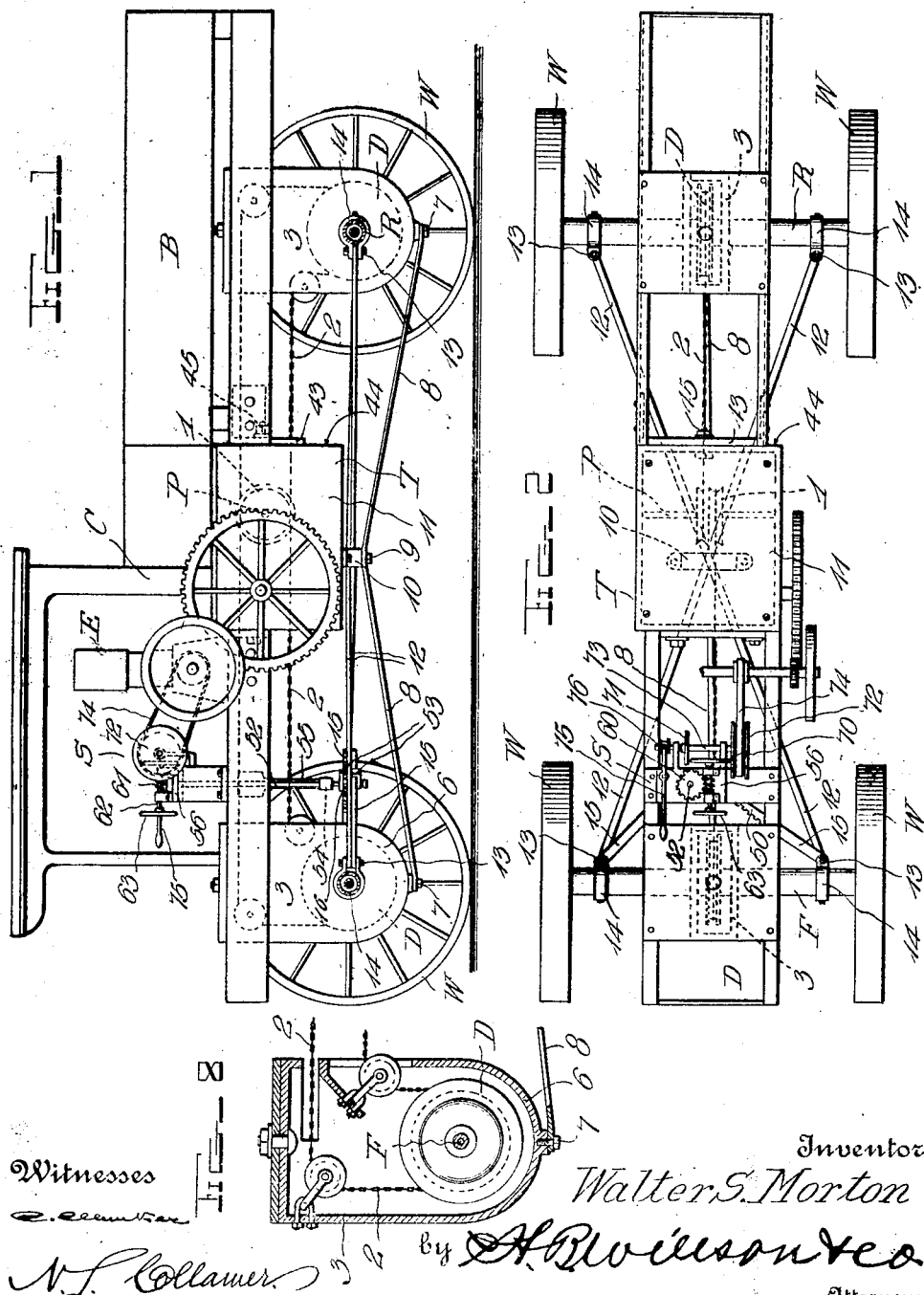

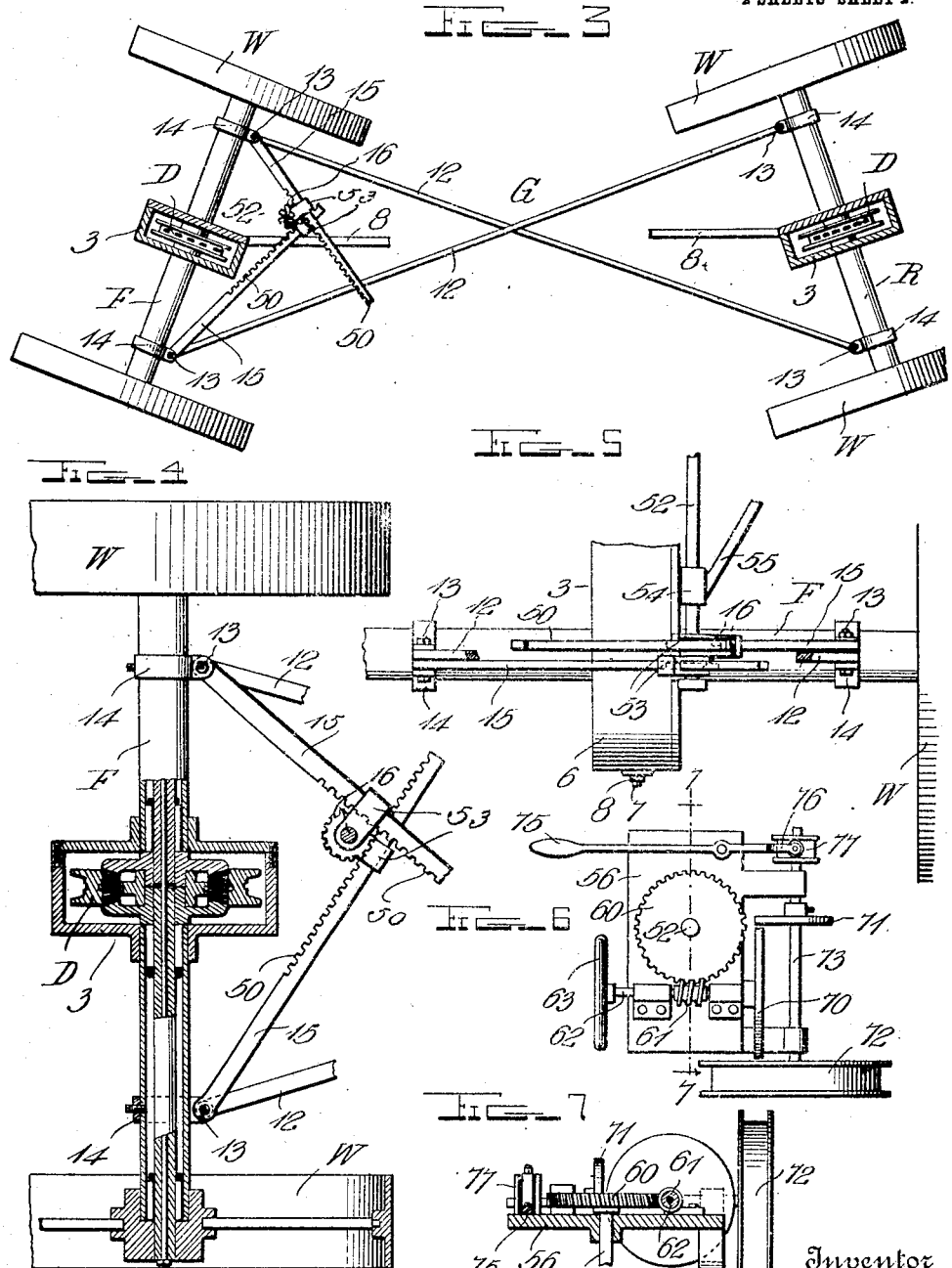

WALTER S. MORTON, OF PORTSMOUTH, OHIO, ASSIGNOR TO SAMUEL F. DUNKLE, TRUSTEE, OF HARRISBURG, PENNSYLVANIA.

STEERING MECHANISM FOR TRACTION-ENGINES.

1,062,788.

Specification of Letters Patent.   Patented May 27, 1913.

Application filed October 10, 1911. Serial No. 653,914.

*To all whom it may concern:*

Be it known that I, WALTER S. MORTON, a citizen of the United States, residing at Portsmouth, in the county of Scioto and State of Ohio, have invented certain new and useful Improvements in Steering Mechanism for Traction-Engines; and I do declare the following to be a full, clear, and exact description of the invention, such as will enable others skilled in the art to which it appertains to make and use the same.

This invention relates to traction engines, and more especially to the steering mechanism therefor; and the object of the same is to adapt the steering mechanism to the front axle of a pair which are connected by a short-turning gear, both axles being driven by chains from a source of power located between the two.

More particularly the present invention consists in the details of connection between the steering mechanism and the engine whereby the former may be driven mechanically, and in the specific construction of the short-turning gear and the connection between it and the steering mechanism whereby the whole is adapted to a vehicle of this kind.

The following specification describes the preferred manner of carrying out my idea, reference being had to the drawings wherein—

Figure 1 is a side elevation, partly in section; Fig. 2 is a plan view of the chassis;
Fig. 3 is a plan view of the short turning gear and the racks by which the front axle is connected with the steering mechanism, and a section through the driven sprocket casings; Fig. 4 is an enlarged horizontal section through the center of the front axle and the differential therein, one end of the axle and one wheel being shown in plan view; Fig. 5 is a rear elevation of this device, looking at Fig. 4 from the right; Fig. 6 is a detailed plan view of the steering mechanism proper, on an enlarged scale, and Fig. 7 is a section on the line 7—7 of Fig. 6; Fig. 8 is a vertical section through the housing inclosing the parts contained therein.

The wheels W of this motor-driven vehicle (which may be a traction engine or an automobile) are secured to the outer ends of front and rear axles F and R respectively, each made in two parts connected by a differential which includes a driven sprocket D, and the running gear or chassis supported by said axles carries a body comprising a box B and a cab C. In the latter is disposed the steering mechanism which forms the subject matter of this patent, whereas the driving mechanism connected with the gasolene engine E transmits power through the transmission mechanism T and the driving shaft P as explained in a companion application bearing Serial Number 653,915 and filed herewith. I have not in the present case illustrated or described the exact form of the drive chain which I prefer to employ, as the same forms the subject matter of a companion application filed this day by me and bearing Serial Number 653,916 and it will be understood that the face of the driving and driven sprockets will be shaped to conform with said chain. The gist of the present patent lies in the mechanism for steering a vehicle of this kind embodying the short-turning gear, the driving mechanism above referred to and set forth in the companion case, and the torsion pivot which will be described below.

Briefly described, the power shaft P carries a double sprocket wheel 1 from which lead two chains 2 forward and backward to the front and rear axles respectively, and each chain passes over two guide pulleys supported on swinging hangers within a housing 3 surrounding the driven sprocket D forming part of the differential at the center of an axle, the loop or extremity of the chain passing around said sprocket as will be understood. In this connection reference is made to Figs. 1, 4 and 8. As to the torsion pivot, in a vehicle of this character having a long body the cab C is by preference made separate from the box B and these parts are independently mounted on the front and rear ends of the framework or chassis. The latter is also by preference made in two parts as best seen in Figs. 1 and 2, and these two parts have face plates 43 and 44 which rest and rub against each other and are connected by a torsion bolt 45, thus permitting the frame or chassis to flex or move sinuously as the vehicle passes over obstructions. This sinuous movement of the vehicle is also facilitated by the employment of brace rods 8 connected at 7 to the lower ends of the drums 6 of the housings 3 which surround the differentials and led thence upward and inward to the point 9 where they are connected to the center of a loop-shaped guide 10 which is carried beneath the center of the casing 11 that incloses the transmission mechanism T. Through said guide pass the rods or bars 12 of the short-turning gear G, whose outer ends are pivotally connected as at 13 with collars 14 surrounding the axles near the wheels W, and the centers of said rods cross each other loosely where they pass through said guide 10 as usual in short-turning gear.

Coming now more particularly to the gist of the present invention, the rack bars 15 have teeth 50 engaging with gears 16 which are fast on the lower end of an upright shaft 52. and guides 53 loosely engage said shaft on opposite sides of the gears and also engage said racks whereby the latter may slide from the position shown in Fig. 4 to that shown in Fig. 3 as will be clear. Said shaft rises from the gears 16 (slightly to one side of the forward drive-chain 2, passes), through a bearing 54 carried by a bracket or support 55 (see Fig. 5) within the chassis of the machine, and up through a standard 56 mounted on the floor of the cab C as best seen in Fig. 1; and the upper end of this shaft carries a worm wheel 60 (see Figs. 6 and 7) whose teeth engage a worm 61 on a horizontal shaft 62 having a hand wheel 63 by means of which the vehicle may be steered by hand when the road is not too rough or the load too heavy. In such case, however, it may be desirable if not necessary to employ power for steering the vehicle, so long as it is under control of the pilot. For this purpose I provide the other end of the shaft 62 with a friction wheel 70 standing between two other wheels or disks 71, 72 which are mounted fast on a shaft 73 journaled in bearings at right angles to the shaft 62; and one of said wheels, as for instance, that numbered 72 may be connected with the engine E in any suitable manner as by a belt 74 as seen in Fig. 1. Pivotally mounted on the standard 56 within reach of the pilot is a lever 75 having a fork 76 loosely engaging a grooved wheel 77 fast on said shaft 73, and when the lever is shifted in the proper direction one of the friction wheels 71 or 72 is brought into contact with the edge of the friction wheel 70 so as to rotate the latter and the worm shaft 62 as desired. As seen in Fig. 6 the shaft 73 has been moved within its bearings to a position where neither friction wheel 71 or 72 contacts with the driven friction wheel 70. and the latter is therefore free to remain idle or to be turned manually by the hand wheel 63. As soon as the pilot has thus operated the steering mechanism by power to a sufficient extent, a movement of the lever 75 to the neutral position shown in this view disconnects the power from the worm shaft and the latter remains at rest, and he may hold it and the entire steering mechanism against the vibration by keeping his hands upon the wheel 63; and after the turn has been negotiated, he may move the lever in the opposite direction to throw the other power disk into contact with the driven friction disk 70, and restore the steering mechanism to its normal position so that the vehicle travels straight along the roadway. In such movement of the steering mechanism in either direction, the gear 16 engages the teeth in the racks 15 and the front axle is turned aside as seen in Fig. 3, and the short-turning gear between this axle and the rear axle R causes the latter to turn aside in the opposite direction to an equal extent. Meanwhile the rods or bars 12 of the short-turning gear move over each other slightly and slide aside within the guide 10 which is secured beneath the transmission casing 11 as seen in Fig. 2, and said guide permits this movement while preventing rattling and dislocation of parts. As it is quite obvious that a short-turning gear whereby both axles are turned instead of one, will steer the vehicle more sensitively or turn it on a sharper curve than where one axle only is turned, it will be clear that the worm connection between the steering shaft 62 and the upright shaft 52 is desirable whether the former be turned by hand or by power; and an added advantage of this construction is that the worm connection between said shafts prevents the vibrations of the axle from being transmitted back to the steering shaft unless the worm be extremely steep which is not desirable. I do not limit myself however to the exact details of construction nor to the sizes, proportions, or materials of parts.

What is claimed as new is:

1. In a motor vehicle, the combination with a main frame, and a motor therein; of a steering mechanism comprising an upright shaft having a worm gear thereon, a horizontal shaft having a worm in mesh with said gear, a friction disk fast on this shaft, a longitudinally shiftable shaft at right angles to said worm shaft, a belt wheel and a driving disk fast on the longitudinal shaft and spaced apart a greater distance than the width of said friction disk, means for shifting this shaft, and connections between said belt wheel and motor.

2. In a motor vehicle, the combination of a main frame, a power shaft thereon, a steering gear including an upright shaft, a supporting stand on the frame for said upright shaft, a worm gear on top of said shaft, a horizontal shaft having on its intermediate portion a worm to mesh with said worm gear; a hand wheel on one end of said horizontal shaft, a disk upon the other end of said shaft, a longitudinally shiftable shaft arranged at right angles to said horizontal shaft, a belt wheel on said shiftable shaft to engage one edge of said disk, a disk upon said shiftable shaft to engage the other side of said disk, means for shifting said shiftable shaft, and means connecting said belt wheel to the power shaft.

3. In a motor vehicle, the combination with a main frame, and a motor therein; of a steering mechanism including an upright shaft connected with the steering axle and carrying a worm gear, a horizontal shaft having a worm in mesh with said gear, a driven wheel fast on this shaft, a longitudinally shiftable shaft standing at right angles to said worm shaft and having fast thereon two driving wheels spaced a greater distance apart than the width of said driven wheel, one of said driving wheels being a belt pulley, a belt connecting it with said motor, a grooved wheel fast on this shaft, and a pivoted lever having a fork engaging the groove thereof for shifting this shaft to throw either driving wheel into contact with the driven wheel, for the purpose set forth.

In testimony whereof I have hereunto set my hand in presence of two subscribing witnesses.

WALTER S. MORTON.

Witnesses:
LEON F. MILLER,
HARRY W. KEENY.